United States Patent [19]

Brunson

[11] Patent Number: 4,527,339

[45] Date of Patent: Jul. 9, 1985

[54] THREE DIMENSION TARGET

[75] Inventor: Amber N. Brunson, Independence, Mo.

[73] Assignee: Brunson Instrument Company, Kansas City, Mo.

[21] Appl. No.: 581,870

[22] Filed: Feb. 21, 1984

[51] Int. Cl.³ ............................................. G01C 15/02
[52] U.S. Cl. ..................................................... 33/293
[58] Field of Search .................. 33/293, 294, 295, 296, 33/297

[56] References Cited

U.S. PATENT DOCUMENTS

| | | | |
|---|---|---|---|
| 969,732 | 9/1910 | Tebyrica | 33/295 |
| 2,788,578 | 4/1957 | Digiacinto | 33/295 |
| 2,840,913 | 7/1958 | Houser | 33/295 |

FOREIGN PATENT DOCUMENTS

0609053  5/1978  U.S.S.R. ............................... 33/293

Primary Examiner—Harry N. Haroian
Attorney, Agent, or Firm—Litman, Day & McMahon

[57] ABSTRACT

A three dimension optical transit target for use in optical tooling, when a construction site of interest is not within view of optical transits, comprises a rod having a target head on one end and an engagement area on another end for contact with the construction site. The target head includes at least one target, preferably defined by cross-hairs, located on a line passing through a rotational axis of the rod and the construction site of interest when the three dimension target is in use. When the three dimension target is supported such that the cross-hairs are visible from a sufficient number of optical transits, the location of the construction site in relation to the transits may be determined if the distance between the cross-hairs and the construction site is known. Several embodiments are described; in one a single set of cross-hairs is used in a target head which, in use, is supported with the cross-hairs positioned on a vertical line passing through the site. In another, two sets of cross-hairs are provided in the target head. In this embodiment, the rod need not be supported vertically above the site. In third and fourth embodiments, alternatives to cross-hairs are described.

14 Claims, 16 Drawing Figures

THREE DIMENSION TARGET

This invention relates to targets used in optical tooling and in particular, to a three dimension target for use when a construction site of interest is not readily viewable by optical transit squares.

Optical tooling provides highly accurate measurements for use in construction. For such tooling, optical transit squares duplicate the function of the familiar carpenter's square. By this method, desired measurements may be made with supreme accuracy, even over relatively large distances. In practice, three transit squares are focused on the site of interest, each of the three defining a plane of view in which the site lies. Alternatively, two electronic digital theodolites may be used. If the precise location of the transit squares is known, the site of interest is precisely located at a point defined by the intersection of the planes or lines defined by the optical reference lines of the transits or theodolites.

Heretofore, optical tooling could only be used when all construction sites of interest were within view of the optical transit squares. Therefore, if the construction site of interest was located in a local depression or hole, or with a portion of the device being constructed between it and the transits, optical tooling could not be used to precisely locate that construction site in relation to other parts of the structure being constructed. Since many other types of tooling and performing measurements are often significantly less accurate than optical tooling, precise construction was not heretofore readily available in such instances. Even the most accurate prior methods of performing such measurements and locating such construction sites were of limited utility since they were very expensive, time consuming, and of such a nature that even small errors tended to compound themselves before the measurements were complete.

The principal objects of the present invention are: to provide a three dimension target for use in optical tooling which may be used to precisely locate a construction site when that site is not within view of optical transit squares; to provide such a target which is relatively inexpensive, easy to use, and provides for highly accurate measurements; to provide such a target which is readily portable; to provide such a target which may be rapidly deployed and dismantled without the use of special tools; to provide such a target which is sufficiently durable to withstand use in the field; and, to provide such a target which is particularly adapted for field use by being easily adjustable for accuracy.

Other objects and advantages of this invention will become apparent from the following description taken in conjunction with the accompanying drawings wherein are set forth, by way of illustration and example, certain embodiments of this invention.

DETAILED DESCRIPTION OF THE PREFERRED EMBODIMENT

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
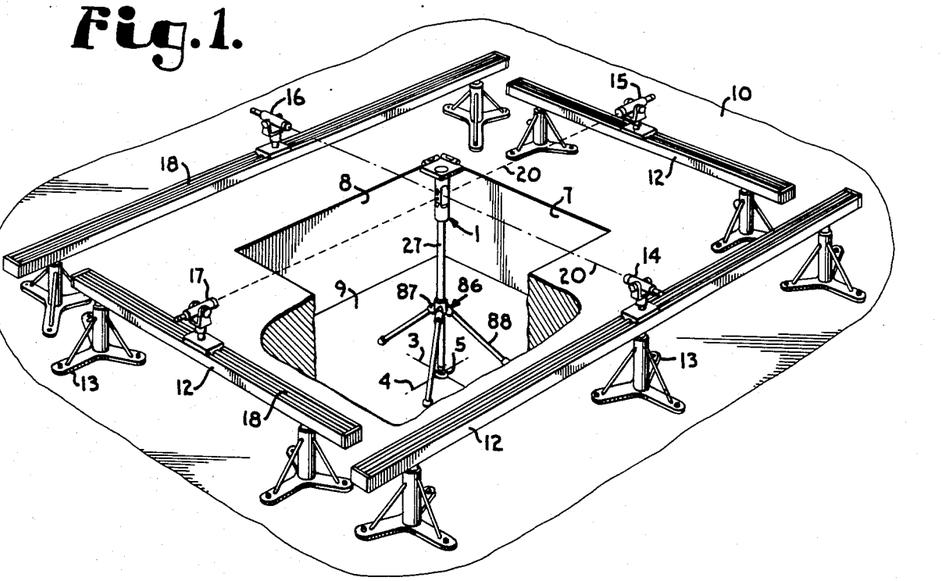
FIG. 1 is a perspective view of a three dimension target according to a first embodiment of the present invention and shown deployed with associated apparatus at a construction site.

Referring more in detail to the drawings:

The reference numeral 1 generally indicates a three dimension target according to the present invention. The three dimension target 1 is shown in FIG. 1 in use in a construction environment. Lines 3 and 4 define a construction site 5, the exact location of which is to be determined through use of optical tooling methods including the three dimension target 1. The construction site 5 is located in a pit 7 defined by side walls 8 and a pit floor 9 in a work area floor 10. Tooling bars 12 are supported over the working area floor 10 by stands 13 and carry optical transit squares 14, 15, 16, and 17 in tracks 18. The tracks 18 have been precisely located about floor 10 by means not shown. The tracks 18 provide for controlled movement of optical transit squares 14, 15, 16 and 17 so that the precise position of the optical transit squares is always known.

In a typical optical tooling operation, the optical reference lines 20 of optical transit squares 14, 15, 16 and 17 may be used to locate a point precisely, as long as the optical reference lines 20 of the transit squares do not define the same line. For example, in FIG. 1 if the precise location of optical transit squares 14 and 15 is known, and both optical transit squares are focused on a single target 22, FIG. 4, then the position of the target 22 is defined as the intersection of the two optical reference lines 20 and is determinable by well-known engineering methods. If the target 22 is not located in the same horizontal plane as the two transit squares 14 and 15, then the two squares may be used to define intersecting vertical planes of sight, not shown, and a third transit, not shown, used to locate the horizontal plane in which the target is located. The intersection of the three planes will, then, define the location of the target 22. Alternatively, a pair of electronic digital theodolites (not shown) may be employed and which provide an accurate value of elevation angle on an accompanying computer.

As shown in FIG. 1, however, there may be times when the construction site 5, whose position is of interest, cannot be viewed by a sufficient number of optical transit squares for optical tooling. In such an instance, a three dimension target 1 and site socket 24, FIG. 3, may be used.

Figures 3, 4, 6:
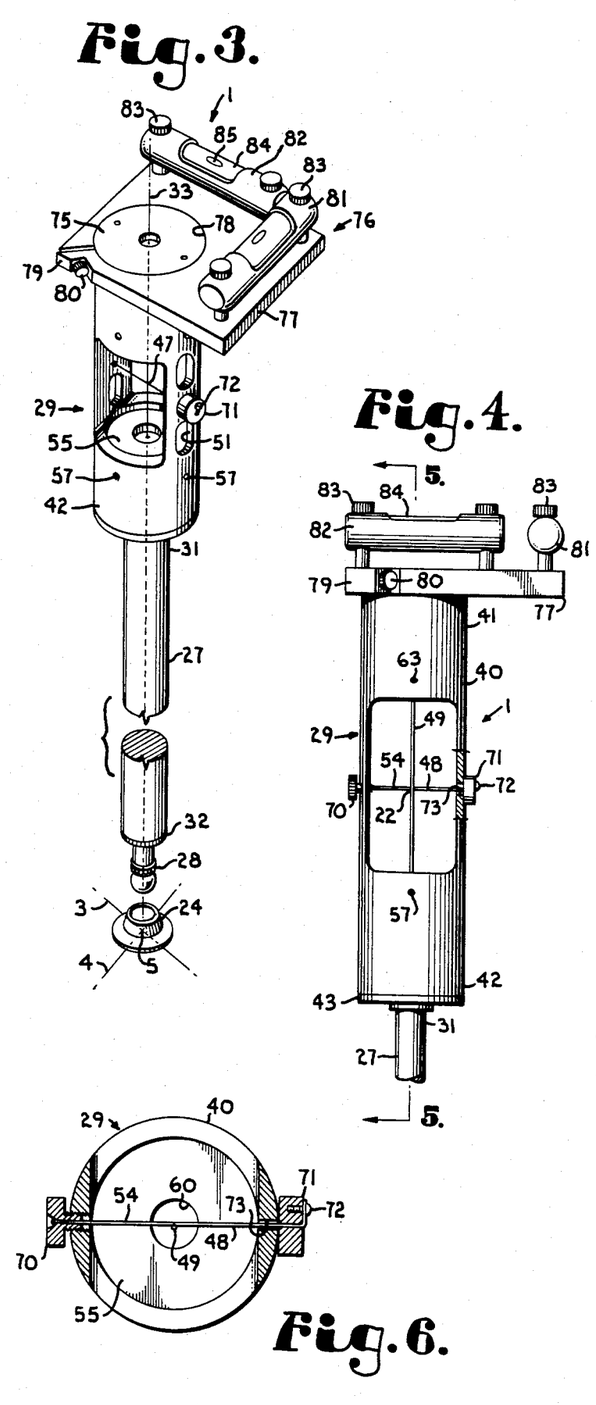
FIG. 3 is an enlarged, fragmentary perspective view of the three dimension target shown in FIG. 1.
FIG. 4 is a fragmentary, front elevational view of the three dimension target shown in FIG. 1, with portions broken away to show internal detail.
FIG. 6 is a top cross-sectional view of the three dimension target taken along line 6—6 of FIG. 5.
Figure 5:
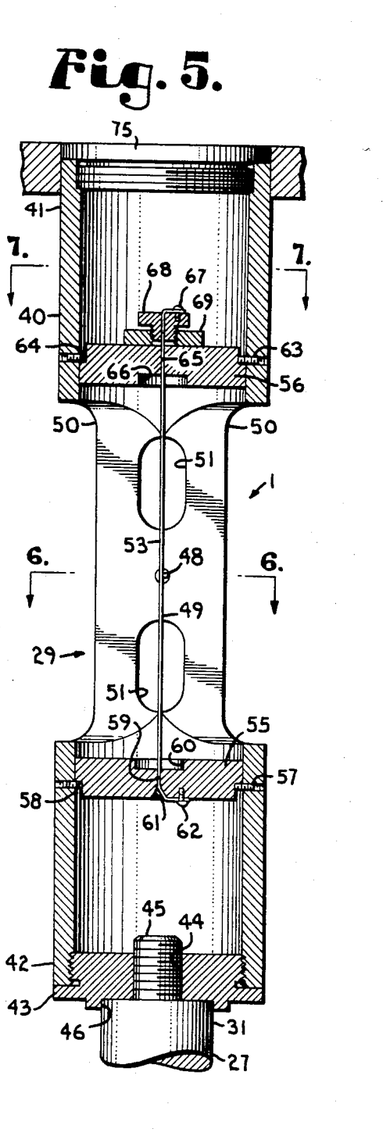
FIG. 5 is an enlarged, fragmentary, longitudinal-sectional view of the three dimension target taken along line 5—5 of FIG. 4.

As shown in FIGS. 3, 4, and 5 the three dimension target 1 includes a rod 27, a site engaging member 28 and a target head 29.

The rod 27 is substantially straight and has an upper end 31, a lower end 32 and a longitudinal axis of rotation 33, FIG. 3. The rod 27 is preferably of circular cross section and constructed of a steel alloy particularly resistant to bending and stretching. Such a material is a steel containing 36% nickel and known generically as invar. The length of the rod 27 may vary depending on the requirements of the particular application.

Figures 7, 8, 9, 10, 11:
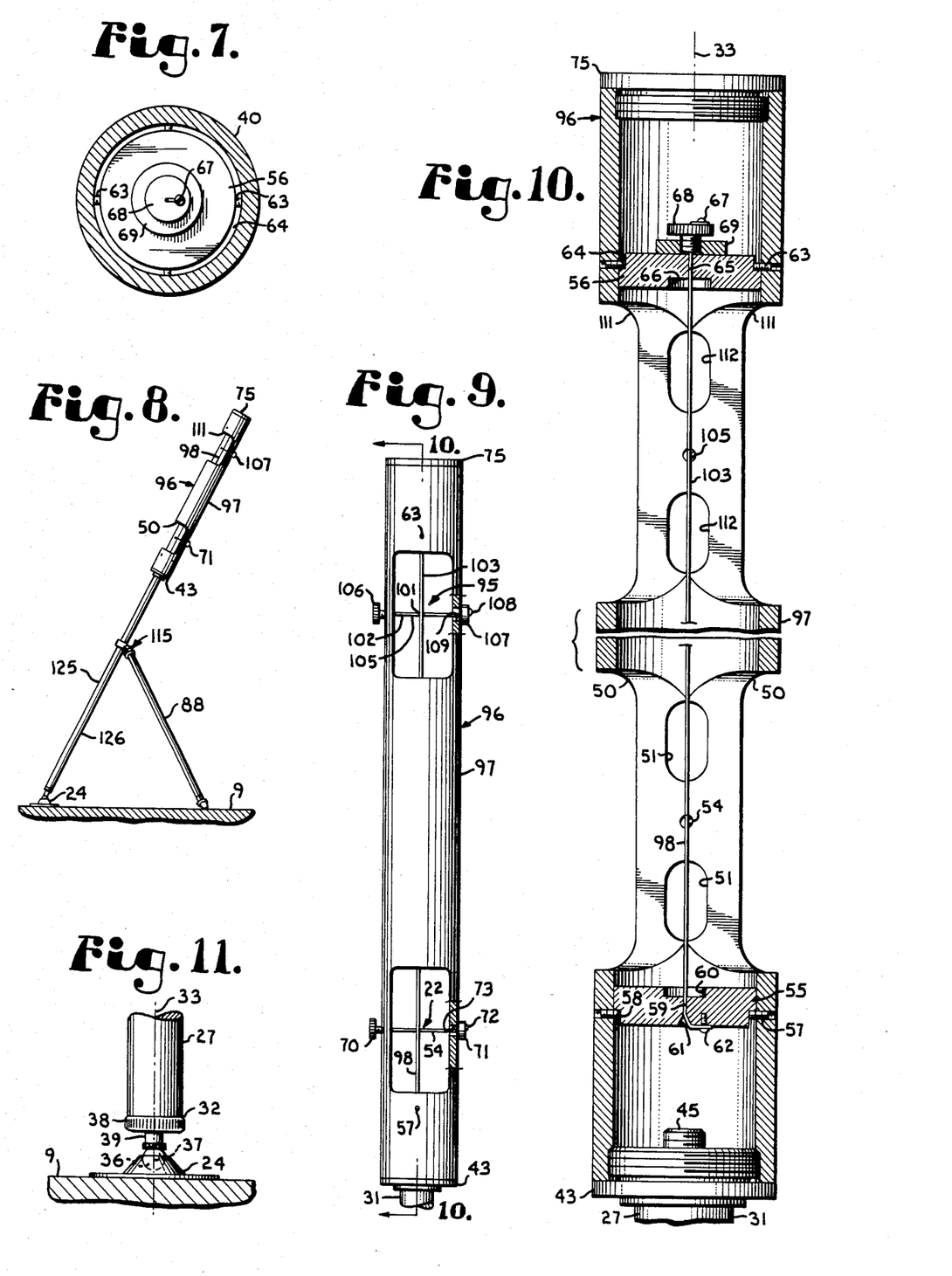
FIG. 7 is a top cross-sectional view of the three dimension target taken along line 7—7 of FIG. 5.
FIG. 8 is a side elevational view of the first alternate embodiment shown in FIG. 2.
FIG. 9 is an enlarged, fragmentary front elevational view of the first alternate embodiment shown in FIG. 2.
FIG. 10 is an enlarged, fragmentary longitudinal-sectional view taken along line 10—10 of FIG. 9.
FIG. 11 is a fragmentary, front elevational view of a portion of the device depicted in FIG. 1.

The site engaging member 28, FIG. 11, may be any of a plurality of means for appropriately engaging the construction site 5, but it is preferably a sphere or ball 36 connected to the lower end 32 of the rod 27 so that the longitudinal axis 33 passes through the center 37 of the ball 36. The ball 36 is receivable within the socket 24 which is placed at the construction site 5 of interest. The ball 36 is shown removably mounted on the rod 27 by cap 38 and extension 39. Removal of the ball 36 from the rod 27 permits replacement of the ball and socket arrangement with other types of site engagement means, not shown.

When the rod 27 and the ball 36 are placed in engagement with the site socket 24, the longitudinal axis 33 of the rod 27 passes through the construction site 5, if the rod 27 is vertical, and the lower end 32 of the rod 27 is securely held in position.

The target head 29, FIGS. 3, 4 and 5, is preferably a cylindrical casing 40 having an upper end 41 and a lower end 42. A lower end cover 43 mounted on the lower end 42 preferably includes a threaded bore 44 therein for attachment of the target head 29 to the rod 27 by engagement with a threaded post 45 attached to the upper end 31 of rod 27. A counterbore 46, FIG. 3, may be used to assure a strong engagement between the rod 27 and the target head 29.

The target 22 is encased within the target head 29 and is located at a juncture 47 of a horizontal and a longitudinal or vertical cross-hair 48 and 49 respectively. Front and rear apertures 50 and side apertures 51 in the sidewall of the casing 40 permit viewing of the target 22 within the cylindrical casing 40. Special targets, not shown, may be attached to the target 22 to provide easier viewing with the optical transit squares 14, 15, 16 and 17.

In the illustrated example, the longitudinal cross-hair 49, FIG. 5, is a wire 53 suspended within the cylindrical casing 40 and positioned coaxially with the longitudinal axis 33. The exemplary horizontal cross-hair 48, FIG. 3, is a second wire 54 suspended within the casing 40 in an orientation orthogonal to the vertical wire 53. The two wires 53 and 54 in this manner form the cross-hairs 48 and 49 and define the target 22.

The vertical wire 53 is supported within the casing 40 by suspension between a base plate 55 and a top plate 56. The base plate 55 is positioned and mounted within the casing 40 by set screws 57. A ledge 58 in the base plate 55 aids positioning of the base plate 55 in the casing 40. An aperture 59 with counterbore 60 is centered where the line defining the longitudinal axis 33 passes through the base plate 55 and permits passage of the wire 53 therethrough. A countersink 61 in the base plate 55 reduces stress placed on the wire 53 near the aperture 59. The wire 53 is attached to the base plate 55 by an anchor screw 62.

The top plate 56 is positioned and mounted within the cylindrical casing 40 by set screws 63. A ledge 64 in the top plate 56 aids positioning of the top plate 56 in the casing 40. An aperture 65 with counterbore 66 is centered where the line defining the longitudinal axis 33 passes through the top plate 56 and permits passage of the wire 53 therethrough. The wire 53 is anchored by a screw 67 to a bolt 68. Rotation of the bolt 68 and a nut 69 permits selective tensioning of the wire 53.

The horizontal wire 54 is suspended within the casing 40 between a bolt 70 and an anchor 71. The wire 54 is attached to the anchor 71 by an anchor screw 72. Adjustment of the bolt 70 permits tensioning of the horizontal wire 54. Selective movement of the anchor 72 about a horizontal slot 73 in the casing 40 permits horizontal adjustment of the horizontal wire 54 to a position adjacent the vertical wire 53 as shown in FIGS. 4 and 6.

A cover 75 in the upper end 41 of the casing 40 provides enclosure of the target head 29.

A level 76 is mounted on the upper end 41 of the casing 40. In the illustrated example, FIG. 3, the level 76 is a plate 77 having an aperture 78 and split legs 79. The plate 77 is clamped to the target head 29 by a bolt 80 extending between the split legs 79. A pair of level vials 81 and 82 are attached to the plate 77 by posts 83. The level vials 81 and 82 include fluid 84 and an air bubble 85 which are used to indicate whether the plate 79 is level and, accordingly, when the rod 27 is vertical. The posts 83 are screw adjustable to calibrate the level vials 81 and 82.

Referring to FIG. 1, if the three dimension target 1 is supported vertically above the construction site 5 such that the target 22 is within sight of the optical transits, the construction site 5 may be precisely located. This is made possible by determining the position of target 22, which is located as precisely as possible on the longitudinal axis 33 of the rod 27, which also passes through the construction site 5, and ascertainment of the distance between the target 22 and the construction site 5.

In FIG. 1, three dimension target 1 is shown supported vertically above the construction site 5 by a stand 86 comprising a clamp 87 and legs 88. The clamp 87 is preferably a ring clamp with a nylon bushing, not shown, which protects the three dimension target 1 during use. The legs 88 may be adjustable in both length and angle of extension from rod 27 to ensure proper orientation of the three dimension target 1.

FIRST ALTERNATE EMBODIMENT

Figure 2:
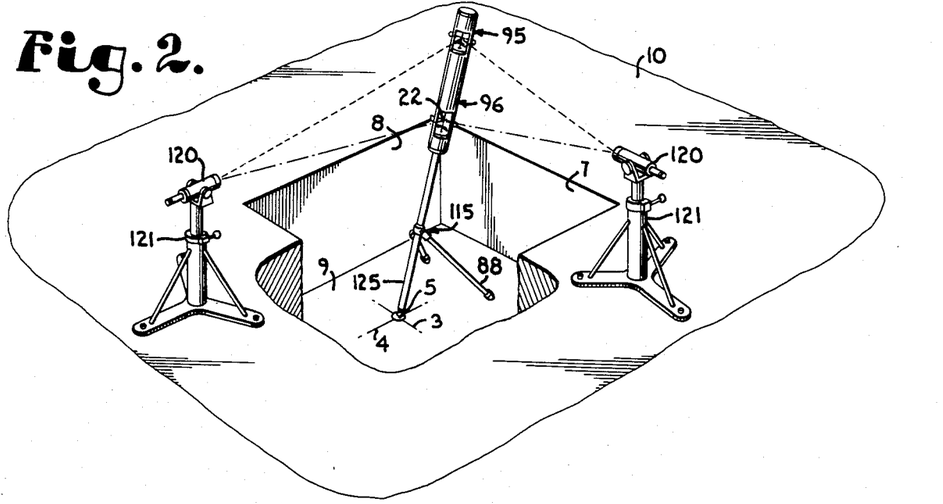
FIG. 2 is a perspective view of a three dimension target according to a first alternate embodiment of the present invention and shown deployed with associated apparatus at a construction site.

A first alternate embodiment of the present invention is shown in FIGS. 8, 9, and 10. Deployment of a three dimension target 1 according to the first alternate embodiment at a construction site is shown in FIG. 2. For this, and the following alternate embodiments, numerals identical to those used for the first described or preferred embodiment indicate like structure.

In the first alternate embodiment, the target head 29 has two targets 22 and 95 therein. The distance between the two targets 22 and 95 will affect the accuracy of measurements taken with the three dimension target 1 and a distance of at least as much as ten inches is preferred, but not required.

The target head 96 of the first alternate embodiment, FIGS. 8, 9 and 10, is adapted for the second target 95 but is otherwise the same as described for the preferred embodiment. The target head 96 is attached to the rod 27 in the same manner and the casing 97 includes the first target 22 in the same manner. In the first alternate embodiment, a vertical wire 98 serves the same purpose as the vertical wire 53 of the preferred embodiment, is retained within the casing 97 in the same manner and is sufficiently long to accommodate the second target 95.

The second target 95 is formed at a juncture 101 of a horizontal cross-hair 102 and a longitudinal or vertical cross-hair 103. The longitudinal cross-hair 103 is shown as a portion of the wire 98. The horizontal cross-hair 102 is shown as a wire 105 suspended within the casing 97 between a bolt 106 and an anchor 107. The wire 105 is secured to the anchor 107 by a screw 108 in a manner similar to that for the horizontal wire 54 of the preferred embodiment. The bolt 106 provides for selected tensioning of the wire 105; and horizontal movement of the anchor 107 about horizontal slot 109 in the casing 99 provides selective positioning of the horizontal wire 105 adjacent the vertical wire 98.

Front and rear apertures 111 and side apertures 112 in the casing 97 permit the second target 95 to be viewed by optical transits.

In FIG. 8, a three dimension target according to the first alternate embodiment is shown supported by a stand means 115. Because of the presence of the two targets 22 and 95, both of which are located substantially on the longitudinal axis 33, the target head 96 need not be supported with the targets 22 and 95 positioned vertically above the construction site 5. Rather, the two targets 22 and 95 define only a single line, corresponding to the longitudinal axis 33, which must pass through a point in the ball and socket whose position is known relative to the construction site 5. Therefore, if the distance between either target 22 or 100 and the ball 36 is known, determination of the location of the two targets 22 and 95 in space mathematically yields the precise location of the construction site 5.

In FIGS. 2 and 8 the stand 115 is shown to have only two legs 88 associated therewith, since a third leg 125, necessary to support the three dimensional target 1 at an angle other than vertical, is provided by a lower portion 126 of the rod 27, which engages the properly placed site socket 24 by means of the ball 36.

In FIG. 2, the optical transits 120 are shown supported by stands 121 without the use of tooling bars. This is to demonstrate that the three dimensional target may be used with any properly placed optical transit squares and is not limited to the arrangement shown in FIG. 1.

SECOND ALTERNATE EMBODIMENT

Figures 12, 14:
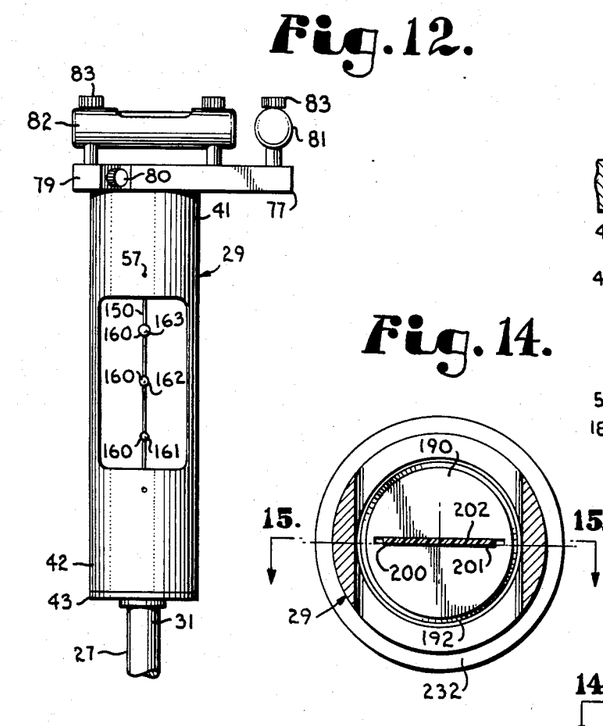
FIG. 12 is a fragmentary, front elevational view of a second alternate embodiment of the three dimension target according to the present invention.
FIG. 14 is a top cross-sectional view of the third alternate embodiment of the present invention taken along line 14—14 of FIG. 13.

A second alternate embodiment of the present invention is shown in FIG. 12. In the second alternate embodiment, the target head 29 has a single longitudinal wire 150 mounted therein. The wire 150 is mounted within the target head 29 by means, not shown, similar to that used to mount the vertical wire 53 in the target head 29 of the first embodiment, FIG. 5, and the vertical wire 98 in the target 96 of the first alternate embodiment, FIG. 10. As for the analogous wires in the preferred embodiment, FIG. 4, and the first alternate embodiment, FIG. 9, the longitudinal wire 150 is mounted colinearly with the axis of rotation of the extension rod 27.

The target head 29 of the second alternate embodiment has a first set of targets 160 mounted therein. The first set of targets 160, comprises beads 161, 162 and 163 mounted on the longitudinal wire 150. Preferably, each of the beads 161, 162 and 163 is a sphere mounted on the wire 150 with the wire passing through centers of the beads. In the illustrated example, the beads 161, 162 and 163 have different diameters to facilitate locating an image on the cross-hairs of the optical transit squares, larger beads to be viewed from greater distances. Preferably, bead 161 is 0.020 inches in diameter, bead 162 is 0.030 inches in diameter and bead 163 is 0.040 inches in diameter. When the second alternate embodiment of present invention is used, a preferred diameter for the longitudinal wire 150 is 0.007 inches.

Except for the differences above described, the second alternate embodiment of the present invention is as described for the preferred embodiment, FIGS. 1, and 3-7. Accordingly, use of the second alternate embodiment is analogous to that described for the preferred embodiment herein. Further, the second alternate embodiment may be used in conjunction with the first alternate embodiment, that is, a target head 29 may include two sets of targets similar to the first set of targets 160, thereby allowing use of the three dimension target 1, with beads as the targets, when the extension rod 27 is not supported substantially vertically relative to the construction site 5 of interest.

THIRD ALTERNATE EMBODIMENT

A third alternate embodiment of the present invention is shown in FIGS. 13, 14, 15 and 16. The deployment of a three dimension target 1 according to the third alternate embodiment, at a construction site, is analogous to that described for the preferred embodiment, FIGS. 1 and 3-7.

Figure 13:
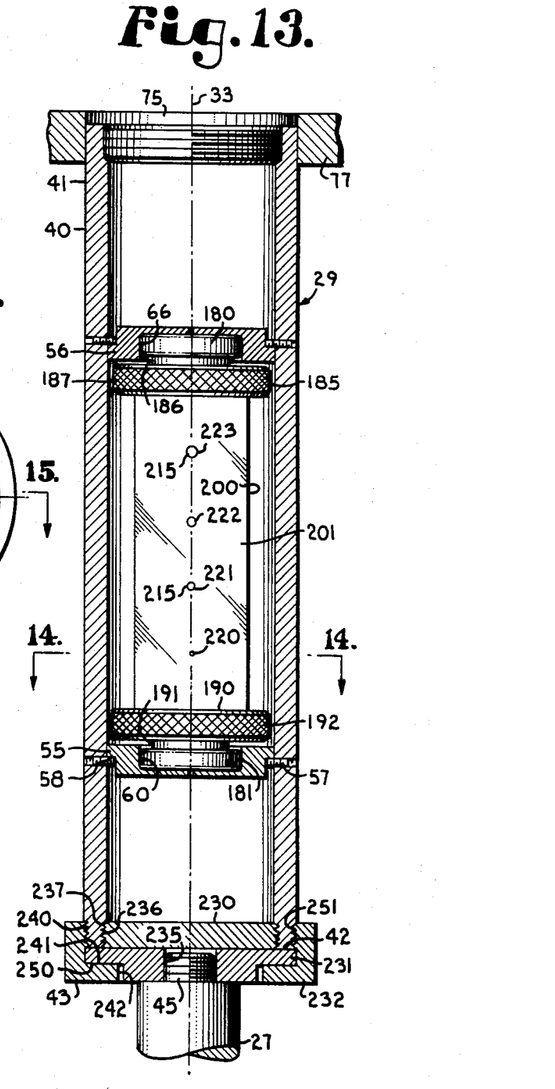
FIG. 13 is an enlarged, fragmentary, longitudinal-sectional view of a third alternate embodiment of the present invention.
Figure 15:
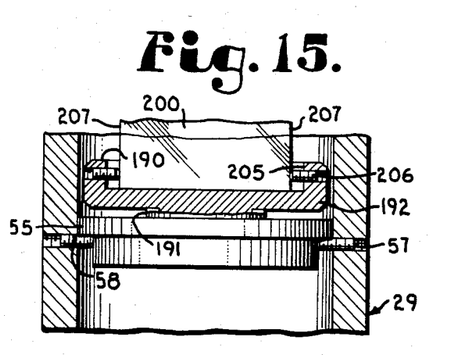
FIG. 15 is an enlarged, fragmentary, front cross-sectional view of the third alternate embodiment of the present invention taken along line 15—15 of FIG. 14.

In the third alternate embodiment, the target head 29 includes a top ball bearing 180 and a bottom ball bearing 181 therein. The top ball bearing 180 is press fitted into the top counter bore 66 in the top plate 56. The bottom ball bearing 181 is press fitted into the bottom counter bore 60 in the base plate 55.

An upper bracket 185 including an axle 186 and a holder 187 is secured to the top ball bearing 180 with the axle 186 rotatably held so that the holder 187 freely rotates about the longitudinal axis 33 of the target head 29.

Similarly, a lower bracket 190 comprising an axle 191 and a holder 192 is mounted on the bottom ball bearing 181.

Figure 16:
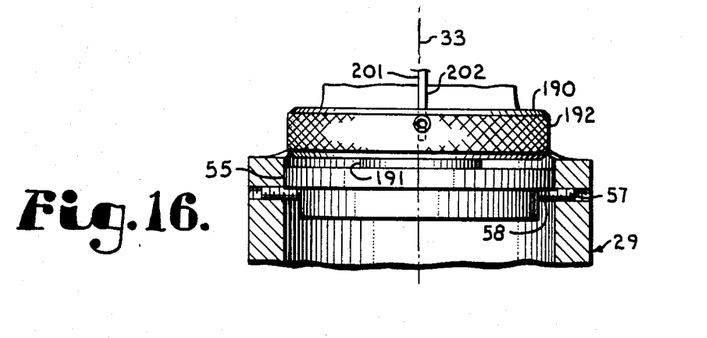
FIG. 16 is an enlarged, fragmentary, side cross-sectional view of the third alternate embodiment of the present invention.

A card 200 is suspended within the target head 29 between the upper holder 187 and the lower holder 192 and includes a front face 201 and a rear face 202. The card 200, FIG. 16, is mounted within the target head 29 such that the longitudinal axis of rotation 33 is coplanar with the front face 201.

Preferably, the card 200 is mounted within a slot 205 in the lower holder 192 and an analogous slot, not shown, in the upper holder 187. Adjustment screws 206 extend radially inwardly through the respective holders 187 and 192 and are colinear with the slots 205 to contact the edges 207 of the card 200. Rotation of the adjustment screws 206 adjusts the horizontal location of the card 200 so that the card 200 is centered relative to its axis of rotation.

The front face 201, FIG. 13, of the card 200 has a first set of targets 215 which are centered on the longitudinal axis of rotation 33 and spaced apart from one another. The targets 215 are four circular targets 220, 221, 222 and 223 respectively 0.02 inches in diameter, 0.030 inches, 0.040 inches, and 0.050 inches in diameter.

The marks 215 are on the longitudinal axis of rotation 33 of the target head 29, for rotation of the card 200 without wobbling and error-creating displacement of the marks 215 from the rotational centerline.

A card and mounting structure similar to that described above could be used in conjunction with a first alternate embodiment analogous to that described in FIGS. 8 through 10 and may include two sets of targets.

A slip joint between the rod 27 and the target head 29 is shown in FIG. 13. There, the lower end cover 43 includes a cylinder insert 230, a rotation plate 231 and a slip ring 232. The rotation plate 231 includes a threaded bore 235 therein for engagement with the threaded post 45 on the extension rod 27. The cylinder insert 230 is mounted within the lower end 42 of the cylindrical casing 40. Threads 236 on the insert 230 engage with threads 237 in the cylindrical casing 40 to retain the insert 230 therein.

The slip ring 232 provides for mounting of the target head 29 onto the extension rod 27. The slip ring 232 includes a side wall 240, bottom wall 241 and central aperture 242. In assembly, the wing 250 on the rotation plate 231 is seated against the bottom wall 241 of the slip ring 232. The target head 29 is then threaded onto the threads 251 on the side wall 240 of the slip ring 232. The target head 29 is inserted into the slip ring 240 until the lower end 42 engages the rotation plate 231 mounted on the extension rod 27.

The slip ring 232 allows rotation of the target head 29 about the longitudinal axis of rotation 33 without disengaging the target head 29 and extension rod 27 from one another. In this manner, the target head 29 may be rotated for viewing by optical transit squares without the necessity of rotating, or otherwise disturbing, the extension rod 27. The cylinder insert 230, rotation plate 231, and slip ring 232 structure may be used with any of the embodiments described herein, thus adding to the versatility of them in application.

It is to be understood that while certain forms of the present invention have been illustrated and described herein, it is not to be limited to the specific forms or arrangement of parts described and shown.

What is claimed and desired to be secured by Letters Patent is as follows:

1. A three dimension target for optical tooling comprising:
   (a) a target head including a first target for sighting by optical tooling instruments;
   (b) an extension rod having one end with means for connection to said target head and a second end including means for positioning said rod upon a construction site not readily viewable by said optical tooling instruments;
      (i) said first target being positioned substantially on a line coaxial with a longitudinal axis of rotation of said extension rod; and
   (c) means for supporting said extension rod and target head in extension from said construction site whereby said target head is positioned in lines of sight of said optical tooling instruments.

2. A three dimension target according to claim 1 including:
   (a) a second target for sighting with said optical tooling instruments, said second target being within said target head and positioned substantially on said line and spaced apart from said first target.

3. A three demension target for optical tooling comprising:
   (a) a target head including a first target for sighting by optical tooling instruments;
      (i) said first target being at a point of crossing of a first pair of cross-hairs;
   (b) an extension rod constructed from substantially dimensionally stable material and having a circular cross section and a longitudinal axis of rotation therethrough; said extension rod having a first end with means for connection to said target head and a second end including means for positioning said rod upon a construction site not readily visible by said optical tooling instruments;
      (i) said first target being positioned substantially on a line coaxial with said longitudinal axis;
   (c) means for supporting said extension rod and target head in extension from said construction site whereby said target head is positioned in lines of site of said optical tooling instruments;
      (i) said support means including a clamp for grasping said extension rod or said target head and a plurality of legs for supporting said extension rod and said target head above said construction site.

4. A three dimension target according to claim 3 including:
   (a) a second target for sighting with said optical tooling instruments; said second target being within said target head and positioned substantially on said line and spaced apart from said first target;
      (i) said second target being at a point of crossing of a second pair of cross-hairs.

5. A three dimension target for optical tooling comprising:
   (a) a cylindrical target head having an internal chamber including a first target for sighting by optical tooling instruments; said first target comprising a longitudinal wire extending along a rotational axis of said cylindrical target head and a horizontal wire substantially orthogonal to said longitudinal wire and being substantially adjacent said longitudinal wire at said first target;
      (i) said cylindrical target head having at least one aperture therein permitting said first target to be visible from outside of said target head;
   (b) a lower end cover in said cylindrical target head; said lower end cover having a threaded bore therein;

(c) a substantially dimensionally stable extension rod of circular cross section and having a longitudinal axis of rotation therethrough; said extension rod having a first end threaded into said bore in said lower end cover, thereby providing selective mounting of said target head onto said extension rod first end with said first target substantially on a line coaxial with said extension rod longitudinal axis;
  (i) said extension rod having a second end with a spheroidal member mounted thereon; said spheroidal member having a center and being mounted with said center substantially on a line coaxial with said extension rod longitudinal axis and being receivable in and selectively engageable with a site socket placed on a construction site of interest not readily viewable by said optical tooling instruments;
(d) support means including a ring clamp for grasping said extension rod and a plurality of legs for supporting said extension rod with said target head positioned in lines of sight of said optical tooling instruments.

6. A three dimension target according to claim 5 including:
(a) a second target within said target head for sighting by said optical tooling instruments comprising a longitudinal wire and a second horizontal wire and being positioned substantially on said line coaxial with said extension rod longitudinal axis and spaced apart from said first target;
  (i) said longitudinal wire extending along a rotational axis of said cylindrical target head;
  (ii) said horizontal wire being substantially orthogonal to said longitudinal wire and being substantially adjacent said longitudinal wire at said second target.

7. A three dimension target according to claim 5 wherein:
(a) said lower end cover includes slip joint means for permitting rotation of said cylindrical target head about said target head longitudinal axis independently of said extension rod and without actuating dismounting of said target head from said extension rod threaded member.

8. A three dimension target for optical tooling comprising:
(a) a cylindrical target head having a longitudinal bore therethrough, an upper end, a lower end, and at least one aperture therein;
(b) an upper end cover attached to said upper end of said target head;
(c) a lower end cover attached to said lower end of said target head, said lower end cover having a threaded bore therein;
(d) a target for sighting by optical tooling instruments comprising longitudinal and horizontal wires;
  (i) said horizontal wire being suspended within said target head and being substantially orthogonal said longitudinal wire and substantially adjacent said longitudinal wire at said target;
  (ii) said target head aperture permitting sighting of said target by said optical tooling instruments;
(e) first and second central plates mounted within said cylindrical target head;
  (i) said longitudinal wire extending between said central plates;
  (ii) said central plates including means for selectively positioning and tensioning said longitudinal wire;
  (iii) said longitudinal wire being positioned substantially on a longitudinal axis of said cylindrical target head;
(f) a substantially dimensionally stable extension rod of circular cross section having a longitudinal axis of rotation therethrough;
  (i) said extension rod having a first end with a threaded post thereon threadibly receivable into said lower end cover bore and providing selective mounting of said target head onto said extension rod first end with said target substantially on a line coaxial with said extension rod longitudinal axis;
  (ii) said extension rod having a second end with a spheroidal member mounted thereon; said spheroidal member having a center and being mounted with said center substantially on a line coaxial with said extension rod longitudinal axis, and said spheroidal member being receivable in and selectively engageable with a site socket placed on a construction site of interest not readily viewable by said optical tooling instruments;
(g) support means including a ring clamp for grasping said extension rod and three legs for supporting said extension rod with said target head positioned in lines of site of said optical tooling instruments; and
(h) level means providing indication of whether said extension rod is supported extending vertically from said construction site.

9. A three dimension target according to claim 8 wherein:
(a) said level means comprises a plate clamped to said target head upper end and two level vials, each having fluid and a leveling bubble therein, mounted on said plate at right angles to one another.

10. A three dimension target for optical tooling comprising:
(a) a cylindrical target head having a longitudinal bore therethrough and an upper end and a lower end;
(b) an upper end cover attached to said upper end of said target head;
(c) a lower end cover attached to said lower end of said target head and having a threaded bore therein;
(d) a first target comprising longitudinal and first horizontal wires;
  (i) said first horizontal wire being suspended within said target head and being substantially orthogonal said longitudinal wire at said first target;
  (ii) said target head including means for selectively positioning and tensioning said first horizontal wire;
  (iii) said target head having aperatures therein permitting sighting of said first target by optical tooling instruments;
(e) first and second central plates mounted within said target head;
  (i) said longitudinal wire extending between said central plates;
  (ii) said plates including means for selectively positioning and tensioning said longitudinal wire;
  (iii) said longitudinal wire being positioned substantially on a longitudinal axis of said cylindrical target head;
(f) a second target comprising said longitudinal wire and a second horizontal wire;
  (i) said second horizontal wire being suspended within said target head and being substantially orthogonal said longitudinal wire at said second target;

(ii) said target head including means for selectively positioning and tensioning said second horizontal wire;

(iii) said second target being spaced apart from said first target;

(iv) said target head having apertures therein permitting sighting of said second target by said optical tooling instruments;

(g) a substantially dimensionally stable extension rod of circular cross section having a longitudinal axis of rotation therethrough;

(i) said extension rod having a first end with a threaded post thereon threadably receivable into said lower end cover bore and providing selective mounting of said target head onto said extension rod first end with said first and second targets positioned substantially on a line coaxial with said extension rod longitudinal axis;

(ii) said extension rod having a second end with a spheroidal member mounted thereon; said spheroidal member having a center and being mounted with said center substantially on said line coaxial with said extension rod longitudinal axis and being receivable in and selectively engageable with a site socket placed on a construction site of interest not readily viewable by optical tooling instrument; and (h) support means including a ring clamp for grasping said extension rod and two legs for cooperation with said extension rod to support said target head in a position within lines of sight of said optical tooling instruments.

11. A three dimension target for optical tooling comprising:

(a) a cylindrical target head having an internal chamber, a rotational axis and at least one aperture therein;

(b) a longitudinal wire extending along said rotational axis of said target head;

(c) a first target mounted within said cylindrical target head; said target having an axis of rotation;

(i) said first target comprising a first bead mounted on said wire with said wire passing co-axial to said first target axis of rotation;

(ii) said first target being visible from outside of said target head through said aperture;

(d) a lower end cover in said cylindrical target head; said lower end cover having a threaded bore therein;

(e) a substantially dimensionally stable extension rod of circular cross section and having a longitudinal axis of rotation therethrough; said extension rod having a first end with a threaded member thereon threadably receivable into said bore in said lower end cover, thereby providing selective mounting of said target head onto said extension rod first end with said first target substantially on a line coaxial with said extension rod longitudinal axis;

(i) said extension rod having a second end with a spheroidal member mounted thereon; said spheroidal member having a center and being mounted with said center substantially on a line coaxial with said extension rod longitudinal axis and being receivable in and selectively engageable with a site socket placed on a construction site of interest not readily viewable by said optical tooling instruments;

(f) support means including a ring clamp for grasping said extension rod and a plurality of legs for supporting said extension rod with said target head positioned in a line of sight of said optical tooling instruments.

12. A three dimension target according to claim 11 including:

(a) a second target within said target head for sighting by said optical tooling instruments comprising a second bead; said second bead having an axis of rotation;

(i) said second bead mounted on said wire with said wire passing coaxially with said bead axis of rotation;

(ii) said second target being visible from outside of said target head.

13. A three dimension target for optical tooling comprising:

(a) a cylindrical target head having an internal chamber, a rotational axis and at least one aperture therein;

(b) a longitudinal wire extending coaxially with said target head rotational axis;

(c) a target mounted within said cylindrical target head;

(i) said target comprising first, second and third spherical beads; said first spherical bead having a diameter of approximately 0.040 inches; said second spherical bead having a diameter of approximately 0.030 inches and said third spherical bead having a diameter of approximately 0.020 inches;

(ii) each of said beads having a center and being mounted on said wire with said wire passing through said bead centers; said beads being spaced apart from one another;

(iii) said target being visible from outside of said target head through said aperture;

(d) a lower end cover in said cylindrical target head; said lower end cover having a threaded bore therein;

(e) a substantially dimensionally stable extension rod of circular cross section and having a longitudinal axis of rotation therethrough; said extension rod having a first end with a threaded member thereon threadably receivable into said bore in said lower end cover, thereby providing selective mounting of said target head onto said extension rod first end with said first target substantially on a line coaxial with said extension rod longitudinal axis;

(i) said extension rod having a second end with a spheroidal member mounted thereon; said spheroidal member having a center and being mounted with said center substantially on a line coaxial with said extension rod longitudinal axis and being receivable in and selectively engageable with a site socket placed on a construction site of interest not readily viewable by said optical tooling instruments;

(f) support means including a ring clamp for grasping said extension rod and a plurality of legs for supporting said extension rod with said target head positioned in a line of sight of said optical tooling instruments.

14. A three dimension target for optical tooling comprising:

(a) a cylindrical target head having an internal chamber, a rotational axis and at least one aperture therein;

(b) a card rotatably mounted within said cylinder and having an axis of rotation;

(i) said card rotational axis being concomitant with said target head rotational axis;

(c) a first target mounted within said cylindrical target head comprising a mark on said card;

(i) said mark being located on said card rotational axis;

(ii) said first target being visible from outside of said target head through said aperture;
(d) a lower end cover in said cylindrical target head; said lower end cover having a threaded bore therein;
(e) a substantially dimensionally stable extension rod of circular cross section and having a longitudinal axis of rotation therethrough; said extension rod having a first end with a threaded member thereon threadably receivable into said bore in said lower end cover, thereby providing selective mounting of said target head onto said extension rod first end with said first target substantially on a line coaxial with said extension rod longitudinal axis;
  (i) said extension rod having a second end with a spheroidal member mounted thereon; said spheroidal member having a center and being mounted with said center substantially on a line coaxial with said extension rod longitudinal axis and being receivable in and selectively engageable with a site socket placed on a construction site of interest not readily viewable by said optical tooling instruments;
(f) support means including ring clamp for grasping said extension rod and a plurality of legs for supporting said extension rod with said target head positioned in a line of sight of said optical tooling instruments;
(g) whereby said card may be rotated independently of said target head to position said target within view of said optical transits without movement of said rod and said target head.

* * * * *